United States Patent [19]

Jahoda

[11] 4,414,939
[45] Nov. 15, 1983

[54] METHOD OF AND APPARATUS FOR PREPARING A FUEL MIXTURE FOR AN INTERNAL COMBUSTION ENGINE

[75] Inventor: Stanislav Jahoda, Praha, Czechoslovakia

[73] Assignee: Ustav Pro Vyzkum Motorovych Vozidel, Prague, Switzerland

[21] Appl. No.: 108,332

[22] Filed: Dec. 28, 1979

[30] Foreign Application Priority Data

Dec. 29, 1978 [CS] Czechoslovakia .................... 9148-78

[51] Int. Cl.³ .......................................... F02M 11/00
[52] U.S. Cl. .................. 123/274; 123/432; 261/23 B
[58] Field of Search ............... 123/274, 432, 585, 586; 261/23 B

[56] References Cited

U.S. PATENT DOCUMENTS

| | | | |
|---|---|---|---|
| 2,698,613 | 1/1955 | Jagersberger | 123/586 |
| 3,205,879 | 9/1965 | Von Seggern et al. | 261/23 B |
| 3,543,736 | 12/1970 | Suzuki et al. | 261/23 B |
| 4,073,271 | 2/1978 | Yamazaki et al. | 123/274 |
| 4,086,885 | 5/1978 | Noguchi et al. | 261/23 B |
| 4,104,989 | 8/1978 | Resler, Jr. | 123/586 |
| 4,194,474 | 3/1980 | Endo | 123/432 |

FOREIGN PATENT DOCUMENTS

| | | | |
|---|---|---|---|
| 333971 | 1/1936 | Italy | 123/586 |
| 52-60317 | 5/1977 | Japan | 123/432 |

*Primary Examiner*—Craig R. Feinberg
*Assistant Examiner*—W. R. Wolfe

[57] ABSTRACT

Method of and apparatus for preparing a fuel mixture for spark-ignition engines with a sectional combustion space comprising a minor combustion chamber into which a rich fuel mixture is fed through a minor duct, and a major combustion chamber into which a poor fuel mixture is fed through a major duct. The rich fuel mixture for the minor combustion chamber is withdrawn from a mixer provided in the carburetor or from an injector, while the poor fuel mixture for the major combustion chamber is fed from said mixer into a mixing chamber where it is subsequently mixed with air, whereupon the thus depleted fuel mixture is supplied into the major combustion chamber.

3 Claims, 4 Drawing Figures

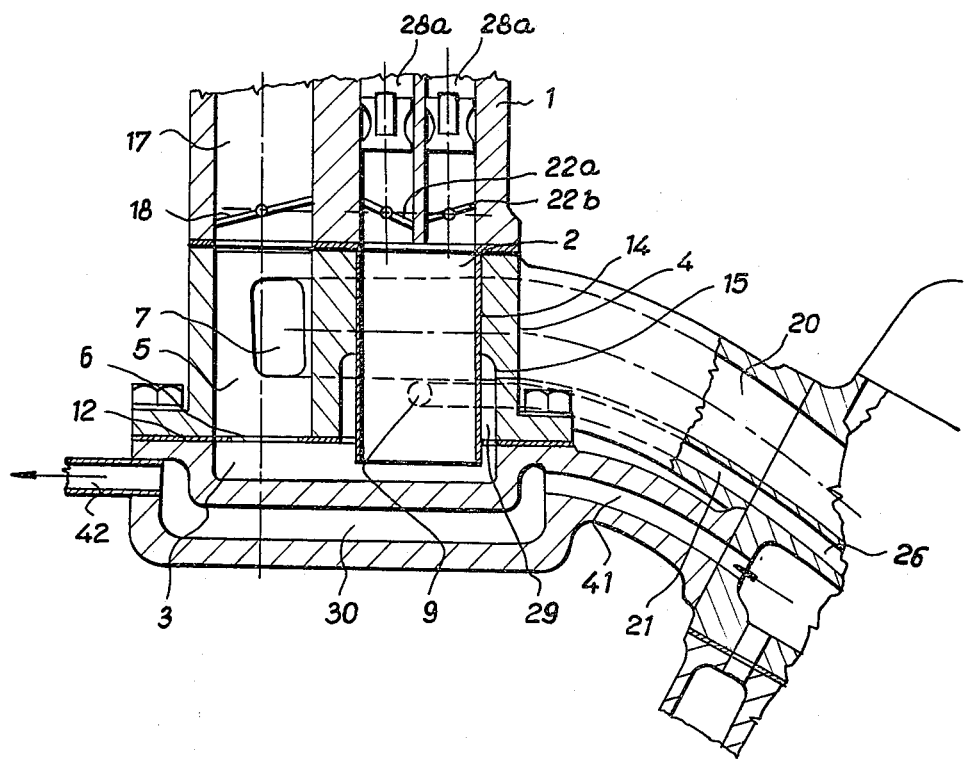
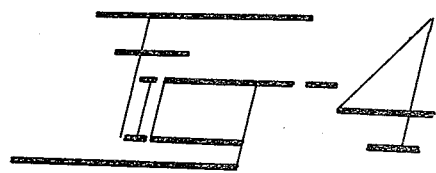

METHOD OF AND APPARATUS FOR PREPARING A FUEL MIXTURE FOR AN INTERNAL COMBUSTION ENGINE

The invention relates to a method of preparing a fuel mixture fed to spark-ignition engines with reciprocatory, or rotary piston motion and having a major and a minor combustion chamber, as well as to an apparatus for carrying out the method.

There are known engines with a sectional combustion space, comprising, apart from a major combustion chamber, one or more minor combustion chambers communicating with the former. A major suction duct controlled by a major suction valve enters the major combustion chamber while an exhaust manifold controlled by an exhaust valve discharges therefrom. On the other hand, in the minor combustion chamber which communicates with the major combustion chamber via a flash duct, there is provided the outlet port of a minor suction duct controlled by a minor suction valve. A spark plug or another source of the fuel ignition is arranged in the minor combustion chamber. The major combustion chamber is supplied with poor fuel mixture while the minor combustion chamber is supplied with an enriched, more readily combustible fuel mixture. The spark plug ignites the enriched fuel mixture in the minor combustion chamber in the top dead center of the piston travel, viz. at the end of compression stroke, whereupon hot gases enter the major combustion chamber from the minor combustion chamber through the flash duct and ignite the poor fuel mixture therein.

It is also known that in order to avoid any malfunction of the afore-mentioned system, it is necessary to provide two fuel mixtures having different mixing ratios, i.e. a poor mixture to supply the major combustion chamber and an enriched mixture for the minor combustion chamber. In known types of such engines there are used two separate means for preparing the two fuel mixture kinds such as either two separate carburetors (see U.S. Pat. Nos. 1,568,638, 2,121,920, 3,092,008, 3,230,939, 3,890,942; G.F.R. Pat. No. 2 259 286), or a combination of a carburetor, and an injector (see HONDA and VOLKSWAGEN systems), or two separate injectors.

Needless to say, such duplications of fuel mixing means are disadvantageous, due to their added expense.

It is true that in a known carburetor (DE-OS No. 1,809,594) there is provided a single fuel mixer from which the fuel mixture is supplied through a minor suction pipe into the minor combustion chamber, and through a major suction pipe into the major combustion chamber; nevertheless the quality of the two mixtures is approximately the same. Such an arrangement is advantageous especially in such engine operations wherein the throttle flap of the carburetor is closed or almost closed, and wherein with engines without the minor combustion chamber, an insufficient combustion of the mixture occurs in the combustion space, due to the influence of residual exhaust gases. By means of such carburetor type it is not possible to prepare at the same time an enriched fuel mixture for the minor combustion chamber and a poor one for the major combustion chamber as required with engines having a sectional combustion space and designed for burning extra poor mixtures.

It is an object of the present invention to provide a method of preparing a fuel mixture having different mixing ratios for a major combustion chamber and for a minor combustion chamber of engines with sectional combustion space as well as an improved apparatus for carrying out the method, such apparatus being less complicated, more reliable and less expensive than the heretofore used apparatuses of this kind and permitting a simple control of mixing ratios of the two fuel mixtures.

The afore-mentioned disadvantages of the prior art are eliminated, according to the invention, by the method of preparing a fuel mixture, which consists in that the prepared rich fuel mixture is divided into two flows of which one is supplied into the minor combustion chamber while the other is subsequently mixed with air and that the thus depleted fuel mixture is supplied into the major combustion chamber.

The apparatus designed for performing the above method comprises a common fuel mixer for the two combustion chambers, said mixer communicating with the minor combustion chamber and with the major combustion chamber via a minor suction tube and the major suction tube, respectively, and is characterised in that the mixer additionally communicates with a distribution chamber which in turn communicates with the minor combustion chamber and with a mixing chamber connected to an air supply piping and communicating with the major combustion chamber.

Between the mixer and the mixing chamber there is preferably provided a distribution chamber communicating with said mixer, said mixing chamber and the minor combustion chamber. The mixer can be embodied either as a carburetor, or an injector. According to a preferred embodiment of the invention the mixer communicates with the distribution chamber via a duct provided in suction piping, there also being provided in said suction piping the mixing chamber which latter communicates, via at least one aperture, with at least one major suction tube, as well as a chamber communicating with the distribution chamber and, via at least one aperture, with at least one minor suction tube. The duct can be embodied as a pipe passed through the chamber within the suction piping. Alternatively, the axial outlet of the afore-said pipe can be obturated by the bottom of the distribution chamber, and the wall of said pipe is provided with radial orifices opening into the distribution chamber. Throttle means of the mixer and air throttling means are kinematically coupled with each other.

An advantage of the present invention resides in that it enables a carburetor designed for engines with sectional combustion space to be simplified up to the level of conventional carburetors.

The arrangement of the suction piping of the invention makes it possible perfectly to distribute the fuel mixture into individual cylinders both into the major and minor combustion chambers.

Among other advantages of the invention there can be named a structural and operational simplicity and consequently relatively low manufacturing costs as well as a good performance of the entire apparatus based upon a good production of the fuel mixture and on minimum output losses which are usually caused by excessive heating of a complex fuel mixture in the suction piping.

Some preferred exemplary embodiments of the invention will be hereinafter described with reference to the accompanying somewhat schematic drawings, in which.

Figure 3:
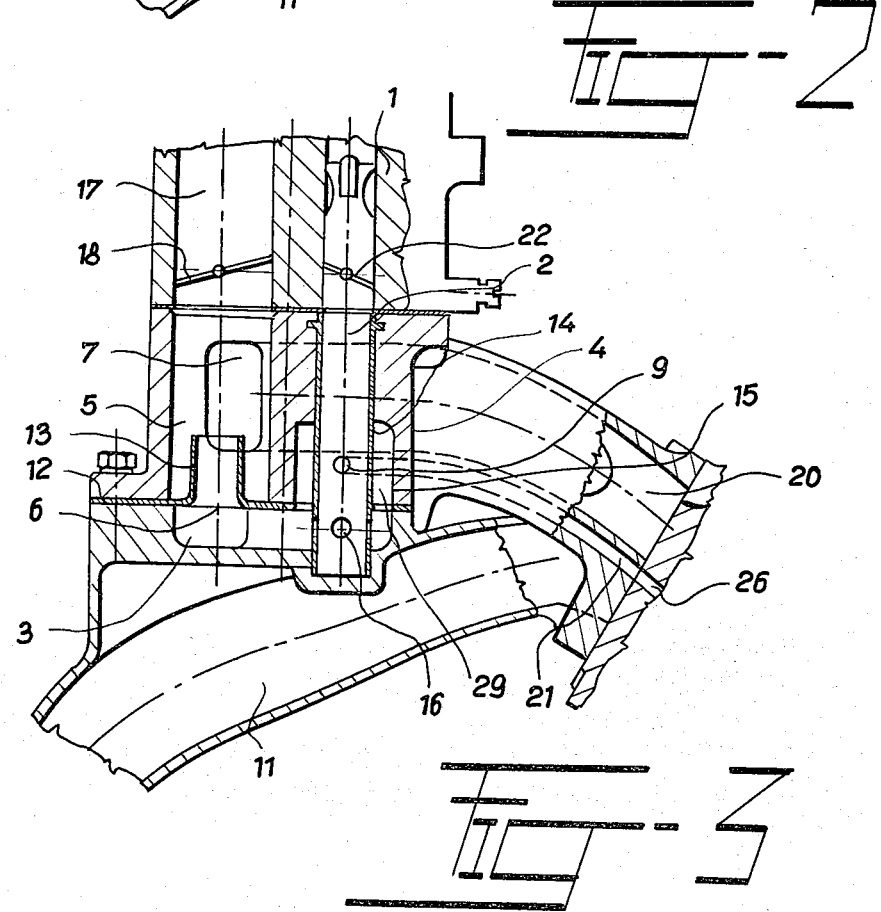

FIG. 3 is a detailed sectional view of a third embodiment of the invention showing the suction piping and the carburetor, a pipe being inserted, alternatively, into the bottom of the mixing chamber; and FIG. 4 is a detailed sectional view of a fourth embodiment of the invention showing the suction piping preheated by the engine cooling medium, the carburetor being equipped with dual fuel mixing means.

As is evident from the above, four embodiments of the invention are shown and described herein. Parts designated by the same reference characters are similar in the various embodiments.

Figure 1:
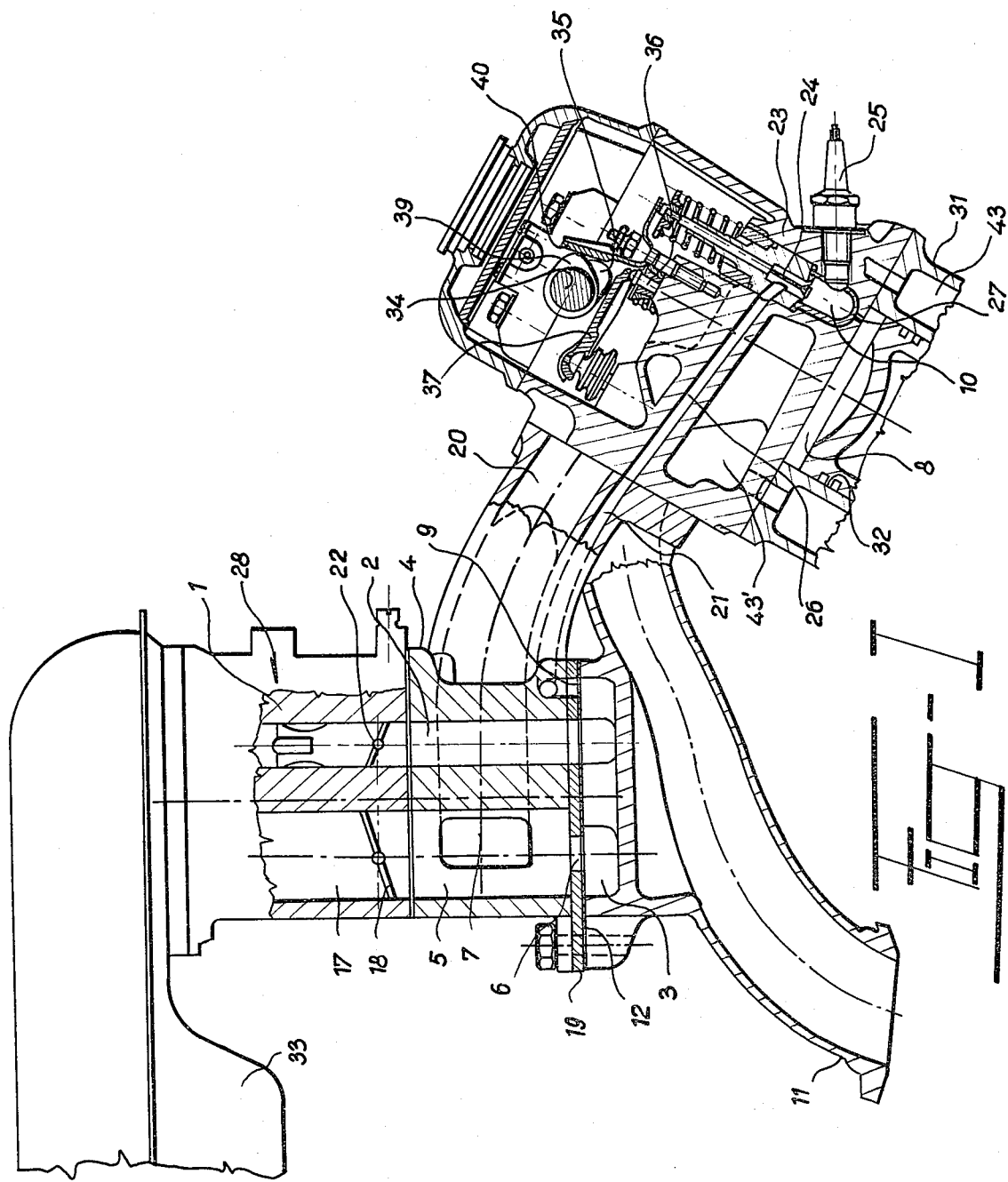
FIG. 1 is a sectional view of a first embodiment of the apparatus according to the invention, showing a carburetor, a suction piping, an exhaust manifold and a cylinder head.

In FIG. 1 there is fragmentarily shown a portion of a slant engine having a water cooled engine block 31 having a cylinder 32 therein, the engine having a cam shaft 34 in the cylinder head 23. The engine has an air cleaner 33, beneath which there is disposed a carburetor 1. It is to be understood that although only one cylinder is shown, the invention is applicable to one or multicylinder spark ignition engines in the cylinders of which a major combustion chamber 8 is provided.

A major suction duct controlled by a major suction or inlet valve, a portion of the stem being designated 36, opens into the major combustion chamber 8. The inlet valve is operated by a cam 35 on camshaft 34 acting through a rocker 37. The major combustion chamber 8 communicates, via a flash duct 27, with a minor combustion chamber 10 into which a minor suction duct 26 opens, which latter is controlled by a minor suction or inlet valve 24. Valve 24 is operated by a cam 39 acting through the medium of a rocker 40. The engine block has a cooling jacket 43 and the engine head has a cooling jacket 43'.

The apparatus further comprises a suction piping 4 consisting of a major suction tube 20, a minor suction tube 21, a mixing chamber 5 and a duct 2. A spark plug 25 is provided in a minor combustion chamber 10.

The major suction duct (not shown) communicates with the major suction tube 20 of the suction piping 4, which tube 20 opens through an aperture 7 into the mixing chamber 5 of said piping 4, the chamber 5 being connected to a separate air supply tubing 17. The mixing chamber 5 communicates, via first aperture 6 of an intermediate insert 12 and of a heat-insulating insert 19, with a distribution chamber 3 provided on an exhaust manifold 11.

The minor suction duct 26 is followed by the minor suction pipe 21 of the suction piping 4 communicating, via second aperture 9 of the intermediate insert 12 and of the heat-insulating insert 19, with the distribution chamber 3 into which the duct 2 opens.

The apparatus further comprises a carburetor 1 which is provided with a mixer 28 for preparing a rich fuel mixture with a major control baffle or butterfly valve 22 and with an air supply tubing for the additional depleting of the rich fuel mixture which is provided with a minor control or butterfly valve 18. The carburetor 1 communicates with the suction piping 4 in such a manner that the air supply tubing 17 is followed by the mixing chamber 5 of the suction piping 4 while the mixer 28 communicates with the duct 2 provided in said suction piping 4.

The above-described apparatus according to the invention operates as follows:

The mixer 28 supplies a rich fuel mixture having a mixing ratio specially prepared with regard to the operation of the minor combustion chamber 10. Such rich fuel mixture is discharged from the mixer 28 and enters, via duct 2, the distribution chamber 3 in which it is homogenized, on the one hand, by evaporating and, on the other hand, by whirling.

A smaller portion of such homogenized fuel mixture is passed, via second aperture 9, into the minor suction tube 21, and through the minor suction duct 26 into the minor combustion chamber 10. The remaining portion of said rich fuel mixture is supplied, via first aperture 6 of the intermediate insert 12, into the mixing chamber 5 where it is mixed with air fed through the air supply tubing 17, thus forming a poor fuel mixture which is led through the aperture 7 into the major suction tube 20 and further on through the major suction duct (not shown) into the minor combustion chamber 8.

To attain an appropriate homogenization and also the poor fuel mixture, the distribution chamber 3 is preheated either by the engine cooling medium or by exhaust gases, or, alternatively, by any of other known modes.

The correct choice of the air proportion drawn in by the air supply tubing 17, relative to the amount of fuel mixture coming from the mixer 28 of the carburetor 1, or from an injector, is controlled by a suitable coupling provided between the major control baffle 22 or baffles 22a, 22b, respectively, of the mixture 28 and the minor control baffle 18 controlling the air supply.

The fuel mixture preheating effect can be enhanced in that the pipe 14 is set into the preheated bottom of the distribution chamber 3. Thus the fuel mixture is preheated not only on the bottom of said chamber but already also during the flow through said pipe 14. The fuel mixture whiling effect can be improved by the passage of the mixture through the outlet orifices 16 or the pipe 14.

The second, third, and fourth embodiments, described below, operate in generally the same manner as the first embodiment, except for the differences noted.

Figure 2:
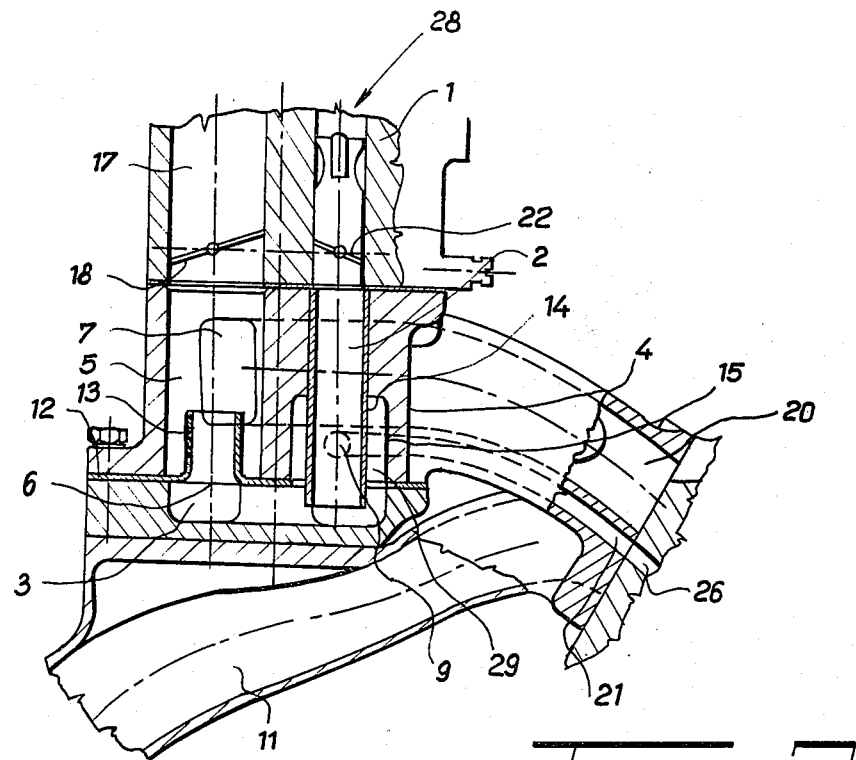
FIG. 2 is a detailed sectional view of a second embodiment of the apparatus of the invention showing the suction piping and the carburetor with an alternative embodiment of the separated mixing chamber.

FIG. 2 shows a second embodiment of the apparatus according to the invention, wherein the duct 2 is constituted by a pipe 14 the outlet opening of which is adjacent a preheated bottom of the distribution chamber 3. The minor suction tube 21 of the suction piping 4 opens, via said second aperture 9, into a recess 15 provided in said suction piping 4, the recess 15 defining an annular space 29. The first aperture 6 of the intermediate insert 12 has an extension in the form of a collar 13. The distribution chamber 3 is embodied as a separate unit interposed between the suction piping and the exhaust manifold 11. As hereinabove set forth, the air supply tubing 17 forms a part of the carburetor 1.

FIG. 3 shows a third embodiment of the invention in which the distribution chamber 3 constitutes also a part of the exhaust manifold 11. Alternatively, however, the afore-said pipe 14 protrudes into the bottom of the distribution chamber 3 and is provided, above said chamber 3, with outlet orifices 16.

FIG. 4 shows a fourth embodiment of the distribution chamber 3 adapted to be preheated by the engine cooling medium. Engine cooling fluid flows from the engine cooling jacket 43 through passage 41 into chamber 30 beneath chamber 3 and out through conduit 42. In this embodiment the carburetor 1 comprises a dual mixer 28a provided respective control baffles 22a and 22b.

The invention has been described with reference to one preferred embodiment, but it is to be expressly understood that the invention may be carried out in other embodiments within the scope of the appended claims.

I claim:

1. In an internal combustion engine having a major combustion chamber, and a minor combustion chamber, the improvement which comprises means for dividing a prepared rich fuel mixture into two flows, means for supplying one of said flows into the minor combustion chamber, means for mixing the other flow with air to form a depleted, lean fuel mixture, and means for supplying the thus depleted fuel mixture into the major combustion chamber, the means for dividing a prepared rich fuel mixture into two flows being a distribution chamber, the means supplying one of said flows into the minor combustion chamber being a minor suction tube, the means for mixing the other flow with air to form a depleted, lean mixture being a mixing chamber, the means to supply the depleted lean fuel mixture into the major combustion chamber being a major suction tube, and comprising means providing an air supply passage connected to the mixing chamber, the mixing chamber being connected to the major combustion chamber by the major suction tube, between the mixer and the mixing chamber there being provided the distribution chamber communicating with the mixer, the mixing chamber and the minor combustion chamber, the mixer communicating with the distribution chamber via a duct provided in the suction piping for the engine, there also being provided in said suction piping the mixing chamber which latter communicates, via at least one first aperture, with at least one major suction tube, as well as a recess communicating with a distribution chamber and, via at least one second aperture, with at least one minor suction tube.

2. An apparatus as claimed in claim 1, wherein the duct is a pipe passed through the recess within the suction piping.

3. An apparatus as claimed in claim 2, wherein the axial outlet of the pipe is obturated by the bottom of the distribution chamber, and wherein the wall of said pipe is provided with radial orifices opening into the distribution chamber.

* * * * *